May 27, 1952  A. L. HAYNES  2,598,538
VARIABLE CAPACITY ROTARY FLUID MOTOR
Filed May 17, 1946  2 SHEETS—SHEET 1

ALEX L. HAYNES
*INVENTOR.*

BY  C.C. McRae
R.G. Harris
J.R. Faulkner
T.H. Oster

ATTORNEYS.

May 27, 1952   A. L. HAYNES   2,598,538
VARIABLE CAPACITY ROTARY FLUID MOTOR
Filed May 17, 1946   2 SHEETS—SHEET 2
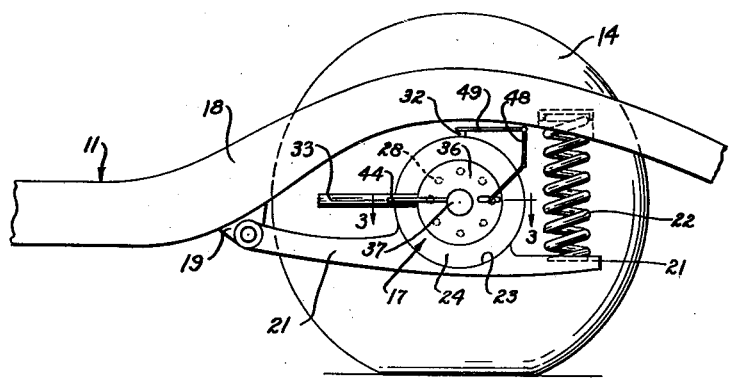
Fig. 2
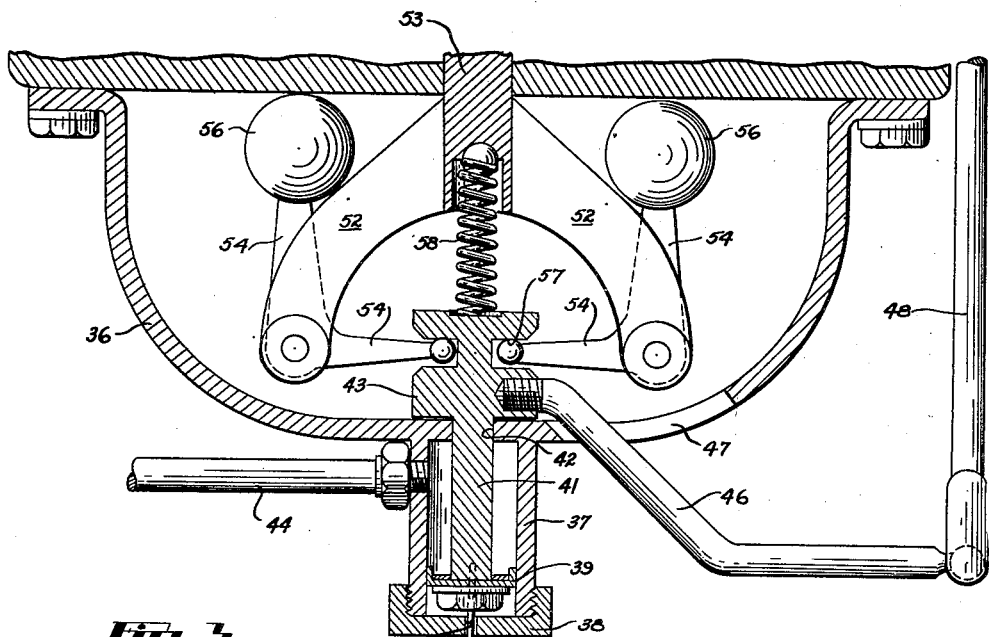
Fig. 3
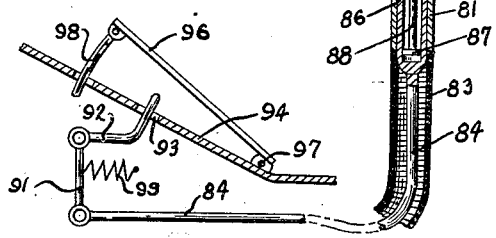
ALEX L. HAYNES
INVENTOR.
BY
ATTORNEYS

Patented May 27, 1952

2,598,538

UNITED STATES PATENT OFFICE 2,598,538

VARIABLE CAPACITY ROTARY FLUID MOTOR

Alex L. Haynes, Detroit, Mich., assignor to Ford Motor Company, Dearborn, Mich., a corporation of Delaware Application May 17, 1946, Serial No. 670,641

1 Claim. (Cl. 121—62)

This invention relates generally to a hydraulic transmission, and more particularly to a hydraulic transmission for transmitting power from the engine of a motor vehicle to the road wheels thereof.

An object of the present invention is to provide a hydraulic transmission for transmitting speed and torque from a vehicle engine to the road wheels, and to eliminate the usual mechanical transmission, gearshift lever, universal joints, propeller shaft, differential, rear axle and other associated mechanical parts. It is another object of the invention to provide a transmission of this type which is sensitive to both speed and torque variations and which automatically establishes the most efficient and effective ratio between the engine and the road wheels.

Another object of the invention is to provide a hydraulic transmission for transmitting speed and torque from the engine to the road wheels, and which is equipped with suitable automatic controls for varying the ratio between the engine and wheels in a continuous and infinitely variable manner, as distinguished from the conventional intermittent or "step" shifting of the gear ratio in the conventional mechanical transmission. The invention therefore provides smooth, steady and flexible operation of the vehicle, and continuously variable acceleration and deceleration are possible without the operation of any manual controls by the driver and with a smoothness unobtainable with other systems.

Another advantage is that the invention can readily be adapted to any type of variable displacement fluid drive, and is not limited to use with any particular type of fluid pump or fluid motor. The controls can be applied to either a variable displacement pump or, as disclosed in this application, to a variable displacement motor located at a road wheel. The controls are sensitive to load variations, and upon an increased load function to automatically increase the displacement of the fluid motor and to thereby increase the torque and decrease the speed at the road wheel. Conversely, upon a decrease in the load or torque requirement, the displacement of the fluid motor is automatically decreased resulting in increasing the speed and decreasing the torque delivered from the engine to the wheel. At the same time the device is sensitive to speed variations and functions upon increased wheel speeds to automatically decrease the displacement of the motor, and conversely, upon decreasing wheel speeds to increase the displacement. The speed and torque responsive controls are so coordinated in the present invention that they function in definite relation to each other and cause the variable mechanism of the variable displacement fluid motor to be progressively varied through an infinite number of steps until an equilibrium is reached between the torque responsive control and the speed responsive control depending upon the particular speed and torque requirements at the moment.

Still another object of the invention is to provide a hydraulic transmission for a motor vehicle which includes a compact unit mounted upon an independent suspension at each of the driven road wheels, each such unit comprising a variable displacement fluid motor equipped with speed and torque responsive control means and adapted to drive the road wheel. With this arrangement, the speed and torque at each driven road wheel is automatically adjusted to meet the particular requirements at all times, thus providing an exceptionally effective and efficient drive for the vehicle.

A further object is to provide means for automatically overriding the speed responsive controls during extreme throttle positions to increase the displacement of the fluid motor and to obtain the fullest advantage of the power available under those conditions. Thus, even though the fluid pressure in the system decreases as the brake mean effective pressure diminishes after passing its peak at partial throttle and less than full engine speed, the proper control can be maintained to automatically secure maximum performance.

Other advantages of the invention will be made more apparent as this description proceeds, particularly when considered in connection with the accompanying drawings, wherein:

Figure 2 is an enlarged end elevation of one of the fluid motor units, as seen in the direction of the arrows 2—2 of Figure 1.

Figure 3 is a fragmentary cross sectional view taken substantially on the plane indicated by the line 3—3 of Figure 2, and also showing in semi-diagrammatic fashion portions of the accelerator mechanism.

*Chassis arrangement*

Figure 1:
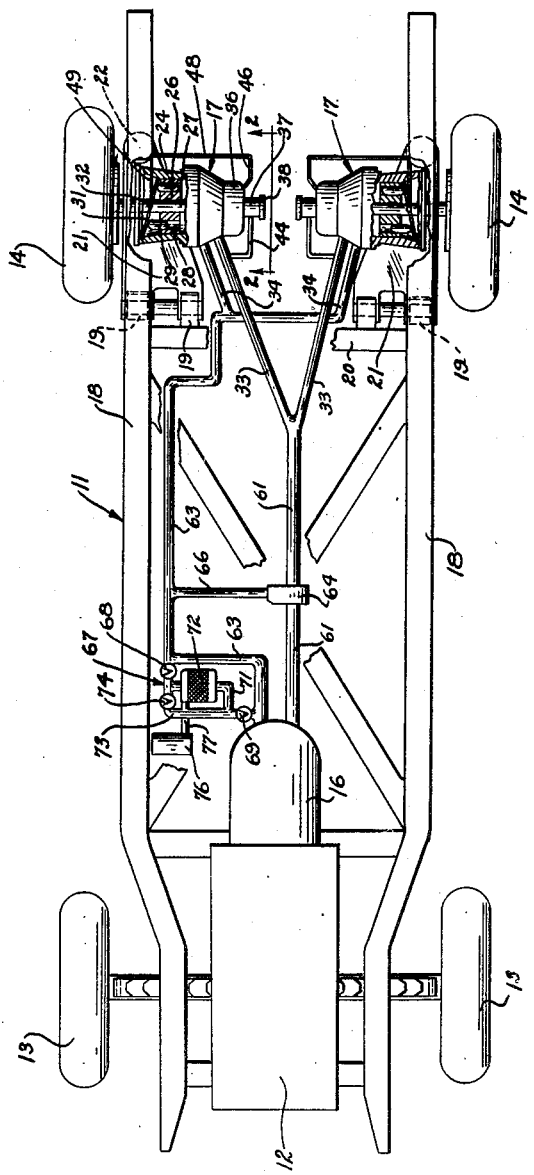
Figure 1 is a semi-diagrammatic plan view of an automobile chassis equipped with the hydraulic transmission of the present invention.

Referring now more particularly to the drawings, there is shown in Figure 1 a plan view of an automobile chassis having the usual frame 11, internal combustion engine 12, steerable front wheels 13, and driven rear wheels 14. The crankshaft of the engine 12 is operatively connected to a constant displacement pump 16 to drive the latter. The pump is shown diagrammatically since any type of fluid pump may be used with the present invention. For example, the pump may be of the spur, helical or herringbone gear type, or it may be a vane pump, radial piston pump, axial piston pump, or other suitable type. The pump 16 is adapted to drive variable displacement fluid motors 17 at each of the rear wheels 14.

As best seen in Figures 1 and 2, the frame 11 of the vehicle has longitudinally extending side sills 18 which are bowed upwardly adjacent the rear wheels 14 to provide clearance for the vertical movement of the rear axles, as in conventional construction. Brackets 19 are welded to the frame sills 18 and to a cross frame member 20 forwardly of the rear wheels and provide pivotal mountings for the "wishbone" shaped suspension levers 21. A coil spring 22 extends between the rearward portion of each of the suspension levers 21 and suitable spring seats on the frame sills 18. Intermediate its ends, each suspension lever 21 is provided with an arcuate seat 23 adapted to support the housing 24 of the fluid motor 17. The housing 24 is suitably secured to the lever 21. A cylinder barrel 26 is rotatably mounted within each of the housings 24 and is secured to the axle 27 of a rear wheel 14 for rotation therewith as a unit. It will be apparent from the foregoing description that each rear wheel is independently mounted upon a stub axle, the latter being rotatably supported upon a suspension lever resiliently mounted from the vehicle frame.

Variable displacement wheel motor

Although various types of variable displacement fluid motors may be used with the present invention, the motors 17 are shown as of the axial piston type in which a series of pistons engage a swash plate, the angularity of which may be adjusted to change the stroke of the pistons and accordingly vary the displacement of the motor. Since each of the motors 17 are identical, only one will be described in detail.

The cylinder barrel 26 of the motor 17 is provided with an annular series of axial cylinders 28 equally spaced about the axis of the barrel. Pistons 29 are reciprocably mounted in the cylinders 28 and at their outboard ends frictionally engage a swash plate 31, the latter being mounted for angular adjustment about a vertically extending shaft 32. Fluid under pressure from the pump 16 is supplied to the cylinders 28 through a branch supply conduit 33, and a branch return conduit 34 serves to return the fluid after being exhausted from the cylinders. Suitable conventional valve means (not shown) are provided for directing the flow of fluid to and from the cylinders 28 in the proper sequence in timed relation to the rotation of the cylinder barrel 26.

It will be apparent that when the swash plate 31 is positioned at right angles to the axis of the cylinder barrel 26 the stroke of the pistons 29 is zero and the cylinder barrel remains stationary. When however, the swash plate is angularly adjusted from this neutral position, axial movement of the pistons 29 in the cylinders 28 is permitted, and rotary movement of the cylinder barrel 26 results. The speed of rotation of the cylinder barrel is dependent both upon the angular position of the swash plate and upon the amount of fluid supplied to the motor. An increased supply of fluid naturally results in an increased speed of rotation of the cylinder barrel 26. Increasing the angle between the swash plate and a plane perpendicular to the axis of the cylinder barrel results in increasing the displacement of the cylinders and the stroke of the pistons, and is followed by a reduction in the speed of rotation of the cylinder barrel while, conversely, decreasing the angularity of the swash plate decreases the displacement and increases the speed. Thus, by adjusting the angular position of the swash plate the ratio between the speed of the engine 12 and the speed of the rear wheel 14 can be varied.

Referring particulary to Figures 2 and 3, it will be noted that a dished cover 36 is bolted to the inboard end of the wheel motor housing 24 and houses speed and torque responsive means for the motor. The cover 36 can be formed either as a stamping or a casting, and may have integrally formed therewith or separately attached thereto a cylinder 37 extending co-axially with the axis of the housing 24 and cylinder barrel 26. The outer end of the cylinder 37 is closed by a cap 38, and a piston 39 is reciprocably mounted within the cylinder. The piston rod 41 of the piston 39 extends through an opening 42 in the cover and is formed with an enlargement 43 at its inner end. A pressure conduit 44 communicates with the cylinder 37, supplying fluid pressure to the latter, as will be described more in detail later.

An inclined actuating arm 46 is rigidly secured at its inner end to the enlargement 43 of the piston rod 41 and extends through an opening 47 in the cover 36. The outer end of the arm 46 is connected by a link 48 to a lever 49 secured to the outer end of the shaft 32 of the swash plate. It will now be apparent that axial movement of the piston 39 within the cylinder 37 is effective through the arm 46, link 48, and lever 49, to rotate shaft 32 and vary the angular position of the swash plate 31.

The axial position of the piston rod 41, and accordingly the angular position of the swash plate 31, is also effected by a speed responsive governor housed within the cover 36. The governor comprises supporting arms 52 secured to an extension 53 of the cylinder barrel 26, and accordingly directly rotatable with the rear wheel 14 since the latter is mounted upon an axle 27 connected to the cylinder barrel. Bell crank levers 54 are pivotally mounted upon the free ends of the supporting arms 52 and at their outer ends carry fly ball weights 56. The inner ends of the bell crank levers 54 are received within an annular groove 57 formed in the extension 43 of the piston rod 41. It will be seen that as the speed of the road wheel and the cylinder barrel increases, the governor is rotated and the weights 56 are thrown radially outwardly by centrifugal force, resulting, through the bell crank levers 54, in moving the piston rod 41 in a laterally outward direction. This movement is yieldably opposed by a compression spring 58 extending between the extension 53 of the cylinder barrel and the inner end of the enlargement 43 of the piston rod.

It will be noted that fluid pressure in the cylinder 37 tends to move the piston rod and connecting linkage in a direction to increase the angularity of the swash plate 31, whereas the governor tends to move the piston rod and linkage in the opposite direction to decrease the angularity of the swash plate.

Hydraulic system

A main delivery or pressure conduit 61 extends from the contant displacement pump 16 and communicates with the branch supply conduits 33 to deliver fluid under pressure to the fluid motors at the rear wheels. Fluid communication is also established between the cylinders 37 at the wheel motors and the branch supply conduits 33 by means of conduits 44. In this manner, the fluid pressure of the system is applied to the pistons 39 in the cylinders 37, and inasmuch as the pressure in the system varies in direct relation with the load or torque at the rear wheels 14, it will be seen that a torque sensitive control is provided for the wheel motors.

The branch return conduits 34 from the wheel motors communicate with a main return conduit 63 to return the exhausted fluid to the pump 16. A bypass circuit is provided for the system to bypass the wheel motors and to prevent the rear wheels 14 from being driven when it is desired to hold the vehicle stationary with the engine idling. This circuit comprises a bypass valve 64 in the main pressure conduit 61 and a bypass conduit 66 extending from the valve 64 to the main return conduit 63. The bypass valve 64 can be connected to the accelerator pedal by conventional means (not shown) to be opened when the accelerator pedal is in its fully released position to bypass the fluid pressure through the bypass conduit 66. The connection can be arranged so that upon initial application of the accelerator pedal the bypass valve is closed blocking communication with the bypass conduit 66.

A cooling circuit is provided for regulating the temperature of the fluid in the system and is controlled at its opposite ends by a manually operated valve 68 and an automatically operated check valve 69. The cooling circuit includes a branch conduit 71 containing a radiator 72 for cooling the fluid, and a branch conduit 73 containing a thermostatically controlled valve 74. Additional fluid which may be required for the system due to leakage, etc., is furnished from a reservoir 76 to the radiator 72 through a conduit 77.

The thermostatically controlled valve 74 regulates the flow of returned fluid through the radiator 72 to control the cooling of the fluid automatically closing when the fluid becomes too hot and forcing the hot fluid to flow through the radiator to be cooled. The manually controlled valve 68 is normally open to permit fluid from the main return conduit 63 to enter the cooling circuit, but may be manually controlled by a suitable lever upon the dash of the vehicle in the event it is necessary to start a stalled engine by pushing the vehicle. With the valve 68 closed, and the vehicle being pushed, the wheel motors 17 function as pumps to pump fluid through the return conduit 63 to the pump 16 which then functions as a motor to drive the engine 12 and to crank the latter to assist in starting. The valve 68 and the check valve 69 function during this operation to prevent fluid pressure from entering the cooling circuit which is connected to atmosphere through the reservoir 76.

Operation

When the engine 12 is running at idling speeds, fluid pressure in the main pressure conduit 61 is bypassed through the valve 64 and conduit 66 to the main return conduit 63, and the piston rod 41 is held by the compression spring 58 in the position shown in Figure 3 in which the swash plate 31 is in its position of maximum angularity and maximum displacement. When, however, the accelerator pedal is depressed to increase the speed of the engine, the bypass valve 64 closes and fluid pressure is supplied to the branch supply conduits 33 and to the wheel motors 17 and the control cylinders 37. The initial rotation of the cylinder barrel 26 in the wheel motor housing 24 is effected at the maximum speed ratio between the engine and wheel since the displacement of the pistons 29 is the greatest. Thus, the maximum torque is available for starting. After wheel 14 begins to rotate, the weights 56 of the governor tend to move the piston rod 41 against the action of the fluid pressure in cylinder 37, and to rotate the swash plate 31 in a counterclockwise direction as seen in Figure 1 through the arm 46, link 48 and lever 49. Movement of the swash plate in this direction decreases the displacement of the pistons 29 and consequently increases the speed of rotation of the cylinder barrel 26, axle 27 and wheel 14.

Inasmuch as the fluid pressure in the cylinder 37 is directed proportional to the torque or load at the rear wheel 14, the cylinder 37 and piston 39 form a torque sensitive control for the swash plate 31. The governor, being rotated with the rear wheel 14, forms a speed sensitive control which cooperates with the torque sensitive control mentioned above to regulate the angular position of the swash plate and to thus vary the displacement of the motor. Inasmuch as this regulation is continuous the variation of the ratio between the engine and the rear wheels is effected through an infinite number of steps. Furthermore, since the axial position of the piston rod 41 and the angular position of the swash plate 31 are determined by the cooperating action of the speed responsive governor and the torque responsive cylinder and piston, the displacement of the variable displacement fluid motor is automatically adjusted in accordance with the particular speed and torque requirements.

During operation, when the load on the driven wheels 14 is increased or decreased, the fluid pressure in the branch supply conduit 33 is similarly increased or decreased, and this fluid pressure variation is transmitted through the conduit 44 to the cylinder 37. The piston 39 and piston rod 41 will be automatically shifted to a new position of equilibrium with the governor, resulting in changing the angular position of the swash plate and the displacement of the fluid motor and accordingly changing the ratio between the engine and the road wheel to provide the most efficient and effective operation of the vehicle.

With the construction thus far described, the controls are both speed and torque responsive, the torque responsive means being governed by the fluid pressure in the system which in turn is proportional to the torque. It is a characteristic of internal combustion engines, however, that the brake mean effective pressure and the torque reach a peak at somewhat less than full engine speed and thereafter decrease as the engine speed increases. Accordingly, during this upper range of operation the pressure in the system is insufficient to automatically provide the most efficient operation of the fluid motor and to secure the maximum performance. This condition is rectified by the construction shown in semi-diagrammatic fashion at the lower portion of Figure 3.

A ferrule 81 is held in position beneath the cap 38 of the cylinder by means of a retaining ring 82, the latter being suitably secured to the cap. A flexible conduit 83 is connected to the lower end of the ferrule and forms a continuation thereof. The ferrule and conduit house a flexible wire element 84. The enlarged head 87 of a rod 88 is freely slideable within the sleeve 86 and the upper end of the rod extends through an aperture 89 in the cap 38 and is suitably secured to the lower end of the piston rod 41. The opposite end of the wire element 84 is attached to a bell crank lever 91, the upper arm 92 of which is bent upwardly and projects a short distance through a hole 93 in the floor board 94 of the vehicle. An accelerator pedal 96 is pivotally mounted upon the floor board at 97 and carries the usual rod 98 for actuating the throttle.

It will be noted that during the major portion of the travel of the accelerator pedal 96, the latter does not engage the arm 92 of the bell crank lever, but that during extreme travel of the accelerator pedal engagement is made with the upper end of the arm 92 to rotate the bell crank lever and move the wire element 84 against the action of the retracting spring 99. By the time the throttle has been advanced to this position the speed responsive governor will normally have moved the piston rod 41 upwardly, as seen in Figure 3, to its extreme position, and the enlarged head 87 of the rod 88 will be adjacent the upper end of the sleeve 86. Actuation of the wire element 84 by the accelerator pedal will thus result in moving the rod 88 and the piston rod 41 downwardly against the action of the governor to increase the displacement of the wheel motor. The speed responsive governor is thus overruled during conditions of extreme throttle positions so that the maximum power of the engine can be utilized and a greater vehicle torque obtained in spite of the fact that the speed has increased. It will be noted that during the major portion of the normal driving range the sleeve 86 is in its upper position and does not interfere with the necessary movement of the piston rod 41 and rod 88.

It will be apparent that not only does the hydraulic transmission of the present invention, as described above, eliminate numerous mechanical parts necessary in the conventional motor vehicle, but that it provides a continuously variable automatic transmission of power between the engine and the driven rear wheels and accomplishes this with a minimum of structure. The wheel motors and controls are compact units and are mounted upon relatively simple suspension means so that the system not only lends itself to simplified vehicle construction and easy maintenance but also can be manufactured at a cost which is not prohibitive.

It will be understood that although the speed and torque responsive controls have in the present instance been shown in connection with the wheel motors, it is within the contemplation of the invention to apply these controls to a variable displacement pump as well should such arrangement be desired. In addition, the controls lend themselves to any type of variable displacement pump or motor.

No means have been shown for placing the system in reverse, but for this purpose a simple override lever could be installed to reverse the angularity of the swash plate and reverse the drive to the rear wheels.

It will be understood that the invention is not to be limited to the exact construction shown and described, but that various changes and modifications may be made without departing from the spirit and scope of the invention, as defined in the appended claim.

What is claimed is:

Control means for a variable speed fluid motor comprising a control arm connected to said motor to vary the displacement of said motor, a fluid pressure actuated device connected to said control arm, a source of fluid pressure, means for supplying fluid pressure to said actuated device from said source of fluid pressure to move said control arm in a direction to increase the displacement of said motor upon an increase in torque, means responsive to the speed of said motor and connected to said control arm to move the latter in the opposite direction to decrease the displacement of said motor, and manually operable means operatively connected to said control arm to move said control arm against the action of said speed responsive means in a direction to increase the displacement of said motor.

ALEX L. HAYNES.

REFERENCES CITED

The following references are of record in the file of this patent:

UNITED STATES PATENTS

| Number | Name | Date |
|---|---|---|
| 1,426,902 | Noel et al. | Aug. 22, 1922 |
| 1,609,833 | Robson | Dec. 7, 1926 |
| 2,114,076 | Gölz | Apr. 12, 1938 |
| 2,326,821 | Boyle | Aug. 17, 1943 |
| 2,337,499 | Roth | Dec. 21, 1943 |
| 2,409,185 | Blasutta | Oct. 15, 1946 |
| 2,478,481 | Griffith | Aug. 9, 1949 |
| 2,500,580 | Segsworth | Mar. 14, 1950 |

FOREIGN PATENTS

| Number | Country | Date |
|---|---|---|
| 9,056 | Great Britain | Apr. 25, 1908 |
| 10,108 | Great Britain | Apr. 28, 1909 |